US009443119B2

(12) United States Patent
Zumsteg

(10) Patent No.: US 9,443,119 B2
(45) Date of Patent: Sep. 13, 2016

(54) PORTABLE ENCODED INFORMATION READING TERMINAL CONFIGURED TO LOCATE GROUPS OF RFID TAGS

(75) Inventor: Philip Zumsteg, Shorewood, MN (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 422 days.

(21) Appl. No.: 13/451,761

(22) Filed: Apr. 20, 2012

(65) Prior Publication Data

US 2013/0278393 A1    Oct. 24, 2013

(51) Int. Cl.
*G06K 7/10* (2006.01)
(52) U.S. Cl.
CPC .................................. *G06K 7/10079* (2013.01)
(58) Field of Classification Search
CPC ... E05B 73/0017; G03B 21/00; G03B 21/26; G06K 7/00; G06K 7/0004; G06K 7/0008; G06K 7/01; G06K 7/089; G06K 7/10; G06K 7/10079; G06K 7/10386; G06K 7/10475; G06Q 10/08; G06Q 10/087; G06Q 10/0875; G08B 5/00; G08B 7/00; G09F 19/18; H04Q 5/22
USPC ............. 340/572.1–572.9, 10.1–10.6, 691.6, 340/870.4; 235/375, 385, 440; 353/28, 46; 1/1
See application file for complete search history.

(56) References Cited

U.S. PATENT DOCUMENTS

| 4,673,932 | A | * | 6/1987 | Ekchian et al. | ........... 340/10.32 |
| 6,659,344 | B2 | | 12/2003 | Otto et al. | |
| 7,003,138 | B2 | | 2/2006 | Wilson | |
| 7,015,967 | B1 | | 3/2006 | Kochi et al. | |
| 7,237,721 | B2 | | 7/2007 | Bilcu et al. | |
| 7,308,158 | B2 | | 12/2007 | Herbert et al. | |
| 7,405,662 | B2 | | 7/2008 | Steinke et al. | |
| 7,407,096 | B2 | | 8/2008 | McQueen et al. | |
| 7,494,063 | B2 | | 2/2009 | Kotlarsky et al. | |
| 7,501,950 | B2 | | 3/2009 | Suzuki | |
| 7,508,306 | B2 | * | 3/2009 | Fujii et al. | ................. 340/572.1 |
| 7,535,361 | B2 | | 5/2009 | Doan et al. | |
| 7,551,090 | B2 | | 6/2009 | Doan et al. | |

(Continued)

OTHER PUBLICATIONS

EPC Global, Specification for RFID Air Interface, EPC Radio-Frequency Identity Protocols Class-1 Generation-2 UHF RFID Protocol for Communications at 860 MHz-960 MHz, Version 1.0.9, Jan. 31, 2005, pp. 1-94.

(Continued)

*Primary Examiner* — Brian Wilson
(74) *Attorney, Agent, or Firm* — Oliff PLC; R. Brian Drozd

(57) ABSTRACT

A portable radio-frequency identifier (RFID) reading terminal can comprise a microprocessor, a memory, an RFID reading device, and a display. The portable EIR terminal can be configured, responsive to successfully reading a plurality of RFID tags attached to a plurality of items sustained by a physical structure, to group the plurality of read RFID tags into zero or more clusters, by correlating quantities of RFID tags read within several time periods to spatial positions of the coverage shapes of the RF signals transmitted by the RFID reading device during the several time periods. The EIR terminal can be further configured to determine the spatial positions of the RFID signal coverage shapes based on the spatial positions and orientations of the portable EIR terminal during the several time periods. The EIR terminal can be further configured to display a quantity of RFID tags within each cluster overlaid over an image.

16 Claims, 7 Drawing Sheets

(56) References Cited

U.S. PATENT DOCUMENTS

| | | | |
|---|---|---|---|
| 7,583,178 B2* | 9/2009 | Hougen et al. | 340/10.1 |
| 7,602,288 B2 | 10/2009 | Broussard | |
| 7,627,191 B2 | 12/2009 | Xu et al. | |
| 7,677,602 B2 | 3/2010 | Bennett et al. | |
| 7,696,874 B2 | 4/2010 | Stevens | |
| 7,702,187 B2 | 4/2010 | Rusman et al. | |
| 7,708,205 B2 | 5/2010 | Kotlarsky et al. | |
| 7,735,731 B2 | 6/2010 | Skaaksrud et al. | |
| 7,756,292 B2 | 7/2010 | Lev | |
| 7,756,319 B2 | 7/2010 | Odell | |
| 7,786,865 B2 | 8/2010 | Park | |
| 7,786,925 B1 | 8/2010 | Knibbe et al. | |
| 7,815,121 B2 | 10/2010 | Kotlarsky et al. | |
| 7,821,400 B2 | 10/2010 | Tabet et al. | |
| 7,831,082 B2 | 11/2010 | Holsing et al. | |
| 7,855,643 B2 | 12/2010 | Tuttle | |
| 7,870,999 B2 | 1/2011 | Skaaksrud et al. | |
| 7,883,013 B2 | 2/2011 | Skaaksrud et al. | |
| 7,886,972 B2 | 2/2011 | Skaaksrud et al. | |
| 7,951,003 B2 | 5/2011 | Russell et al. | |
| 7,961,908 B2 | 6/2011 | Tzur et al. | |
| 7,965,186 B2 | 6/2011 | Downie et al. | |
| 8,115,601 B2 | 2/2012 | Nonaka | |
| 8,149,094 B2 | 4/2012 | Deoalikar et al. | |
| 2002/0165758 A1 | 11/2002 | Hind et al. | |
| 2003/0135433 A1* | 7/2003 | Yan | G06Q 20/203 705/28 |
| 2005/0212676 A1* | 9/2005 | Steinberg | G06K 7/10079 340/572.8 |
| 2005/0212817 A1 | 9/2005 | Cannon et al. | |
| 2006/0022814 A1* | 2/2006 | Nogami | G06K 7/10079 340/505 |
| 2006/0208859 A1* | 9/2006 | Hougen | G06K 7/0008 340/10.1 |
| 2006/0262961 A1 | 11/2006 | Holsing et al. | |
| 2006/0266836 A1 | 11/2006 | Bilcu et al. | |
| 2007/0008136 A1 | 1/2007 | Suzuki | |
| 2007/0063817 A1* | 3/2007 | Cherry | G06K 17/00 340/10.1 |
| 2007/0102506 A1 | 5/2007 | Stevens | |
| 2007/0199995 A1 | 8/2007 | Kotlarsky et al. | |
| 2007/0215706 A1 | 9/2007 | Kotlarsky et al. | |
| 2008/0037899 A1 | 2/2008 | Xu et al. | |
| 2008/0061937 A1 | 3/2008 | Park | |
| 2008/0111661 A1 | 5/2008 | Lin et al. | |
| 2008/0164313 A1 | 7/2008 | Kotlarsky et al. | |
| 2008/0164317 A1 | 7/2008 | Kotlarsky et al. | |
| 2008/0169343 A1 | 7/2008 | Skaaksrud et al. | |
| 2008/0172303 A1 | 7/2008 | Skaaksrud et al. | |
| 2008/0173706 A1 | 7/2008 | Skaaksrud et al. | |
| 2008/0173710 A1 | 7/2008 | Skaaksrud et al. | |
| 2008/0203147 A1 | 8/2008 | Skaaksrud et al. | |
| 2008/0203166 A1 | 8/2008 | Skaaksrud et al. | |
| 2008/0210749 A1 | 9/2008 | Skaaksrud et al. | |
| 2008/0210750 A1 | 9/2008 | Skaaksrud et al. | |
| 2008/0224870 A1 | 9/2008 | Yeo et al. | |
| 2008/0285091 A1 | 11/2008 | Skaaksrud et al. | |
| 2009/0021353 A1 | 1/2009 | Nanaka | |
| 2009/0040025 A1 | 2/2009 | Volpi et al. | |
| 2009/0045913 A1 | 2/2009 | Nelson et al. | |
| 2009/0045924 A1 | 2/2009 | Roberts, Sr. et al. | |
| 2009/0121025 A1 | 5/2009 | Romanchik | |
| 2009/0160638 A1* | 6/2009 | Jesme | 340/539.11 |
| 2009/0161964 A1 | 6/2009 | Tzur et al. | |
| 2009/0243801 A1 | 10/2009 | Strzelczyk | |
| 2009/0245755 A1 | 10/2009 | Lee et al. | |
| 2009/0322537 A1 | 12/2009 | Tapp et al. | |
| 2010/0045436 A1 | 2/2010 | Rinkes | |
| 2010/0073487 A1 | 3/2010 | Sogoh et al. | |
| 2010/0109844 A1 | 5/2010 | Carrick et al. | |
| 2010/0109903 A1 | 5/2010 | Carrick | |
| 2010/0142825 A1 | 6/2010 | Maxwell et al. | |
| 2010/0148985 A1 | 6/2010 | Lin et al. | |
| 2010/0201488 A1 | 8/2010 | Stern et al. | |
| 2010/0201520 A1 | 8/2010 | Stern et al. | |
| 2010/0220894 A1 | 9/2010 | Ackley et al. | |
| 2010/0226530 A1 | 9/2010 | Lev | |
| 2010/0232712 A1 | 9/2010 | Tomita et al. | |
| 2010/0252621 A1 | 10/2010 | Ito et al. | |
| 2010/0271187 A1 | 10/2010 | Uysal et al. | |
| 2010/0296753 A1 | 11/2010 | Ito et al. | |
| 2010/0303348 A1 | 12/2010 | Tolliver et al. | |
| 2010/0308964 A1 | 12/2010 | Ackley et al. | |
| 2011/0052008 A1 | 3/2011 | Holsing et al. | |
| 2011/0084808 A1 | 4/2011 | Tuttle | |
| 2011/0115947 A1 | 5/2011 | Oh | |
| 2011/0128125 A1 | 6/2011 | Kai et al. | |
| 2011/0143811 A1 | 6/2011 | Rodriguez | |
| 2011/0205387 A1 | 8/2011 | Tzur et al. | |
| 2011/0212717 A1 | 9/2011 | Rhoads et al. | |
| 2011/0280447 A1 | 11/2011 | Conwell | |
| 2011/0284625 A1 | 11/2011 | Smith et al. | |
| 2011/0290883 A1 | 12/2011 | Kotlarsky et al. | |

OTHER PUBLICATIONS

U.S. Appl. No. 13/359,005 entitled "Portable RFID Reading Terminal With Visual Indication of Scan Trace", filed Jan. 26, 2012, pp. 1-27.

U.S. Appl. No. 13/452,133 entitled "System and Method for Calibration and Mapping of Real-Time Location Data", filed Apr. 20, 2012, pp. 1-43.

U.S. Appl. No. 13/451,744 entitled "Portable Encoded Information Reading Terminal Configured to Acquire Images", filed Apr. 20, 2012, pp. 1-27.

U.S. Appl. No. 13/451,959 entitled "Portable Encoded Information Reading Terminal Configured to Adjust Transmit Power Level", filed Apr. 20, 2012, pp. 1-38.

U.S. Appl. No. 13/474,014 entitled "Cloud-Based System for Reading of Decodable Indicia", filed May 17, 2012, pp. 1-28.

U.S. Appl. No. 13/545,454 entitled "Cloud-Based System for Processing of Decodable Indicia", filed Jul. 10, 2012, pp. 1-24.

* cited by examiner

PORTABLE ENCODED INFORMATION READING TERMINAL CONFIGURED TO LOCATE GROUPS OF RFID TAGS

FIELD OF THE INVENTION

The invention is generally related to encoded information reading (EIR) terminals and is specifically related to EIR terminals including radio-frequency identification (RFID) reading devices.

BACKGROUND OF THE INVENTION

RFID methods are widely used in a number of applications, including smart cards, item tracking in manufacturing, inventory management in retail, etc. An RFID tag can be attached, e.g., to an inventory item. An EIR terminal can be configured to read the memory of an RFID tag attached to an inventory item.

SUMMARY OF THE INVENTION

In one embodiment, there is provided a portable radio-frequency identifier (RFID) reading terminal comprising a microprocessor, a memory, an RFID reading device, and a display. The portable EIR terminal can be configured, responsive to successfully reading a plurality of RFID tags attached to a plurality of items sustained by a physical structure, to group the plurality of read RFID tags into zero or more clusters, by correlating quantities of RFID tags read within several time periods to spatial positions of the coverage shapes of the RF signals transmitted by the RFID reading device during the several time periods. The EIR terminal can be further configured to determine the spatial positions of the RFID signal coverage shapes based on the spatial positions and orientations of the portable EIR terminal during the several time periods. The EIR terminal can be further configured to display a quantity of RFID tags within each cluster overlaid over an image of the physical structure, with a visual reference to a fragment of the physical structure corresponding to the spatial positions of the RFID tags comprised by each cluster.

In one embodiment, the portable EIR terminal can be further configured to display a scan trace overlaid over the image of the physical structure. The scan trace can be provided by a line comprising a plurality of time varying points, each point being defined by a projection onto a chosen plane at a given moment in time of the coverage shape of the RF signal transmitted by the RFID reading device.

In one embodiment, the portable EIR terminal can further comprise a two-dimensional imager, and can be further configured to determine the spatial position of the RF signal coverage shape based on the position and orientation of the RF antenna relatively to the position of the field of view of the two-dimensional imager.

In one embodiment, the portable EIR terminal can further comprise a motion sensing device, and can be further configured to determine a change of the spatial position and orientation of the RF signal coverage shape based on the motion sensing data received from the motion sensing device. In a further aspect, the motion sensing device can comprise three or more accelerometers configured to measure proper acceleration values of the EIR terminal along three mutually perpendicular axes.

In one embodiment, the portable EIR terminal can be further configured to receive an image of the physical structure from an external computer.

In one embodiment, the portable EIR terminal can be further configured to receive a description of a physical structure, and can be further configured to create an image of the physical structure based on the description.

In one embodiment, the portable EIR terminal can further comprise a two-dimensional imager, and can be further configured to acquire an image of the physical structure using the two-dimensional imager.

In one embodiment, the portable EIR terminal can be further configured to transmit a list of read RFID tags, a count of read RFID tags, a count of clusters of RFID tag bearing items, a list of items in each cluster, and/or a list of locations of clusters to an external computer.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

RFID reading devices usually offer improved efficiency over barcode scanning devices for retail inventory, by being capable of reading multiple RFID tags that are within range of the RF signal transmitted by an RFID reading device. A downside to this multiple-read capability is lack of scanned items localization, due to insufficient correlation between where the RFID reader is located or oriented, and the RFID tags being read. Retail inventory management typically requires more than 90% of the RFID tags present in a department to be successfully acquired during the inventory process. When this high accuracy is not achieved, it is necessary to rescan the entire department, since the locations of any unread RFID tags are unknown.

Item tracking and/or inventory control can be implemented by placing an RFID tag on each inventory item. The EIR terminal can comprise at least one RFID reading device which can be configured to read and/or modify a memory of an RFID tag containing an encoded message. The RFID reading device can transmit and/or receive radio frequency (RF) signals to and from RFID tags attached to inventory items. Each RFID tag can store the tag identifier in its memory. An RFID tag attached to an inventory item can further store in the tag's memory a product code of the item, an EPC (Electronic Product Code) of the item, and/or at least one alphanumeric string identifying the item.

The RFID reading device can be further configured to output decoded message data corresponding to the encoded message, e.g., decoded message data containing identifiers of the items to which the RFID tags are attached. The EIR terminal can be configured to store in its memory and/or transmit to an external computer the item identifiers received from the plurality of RFID tags.

Figure 1:
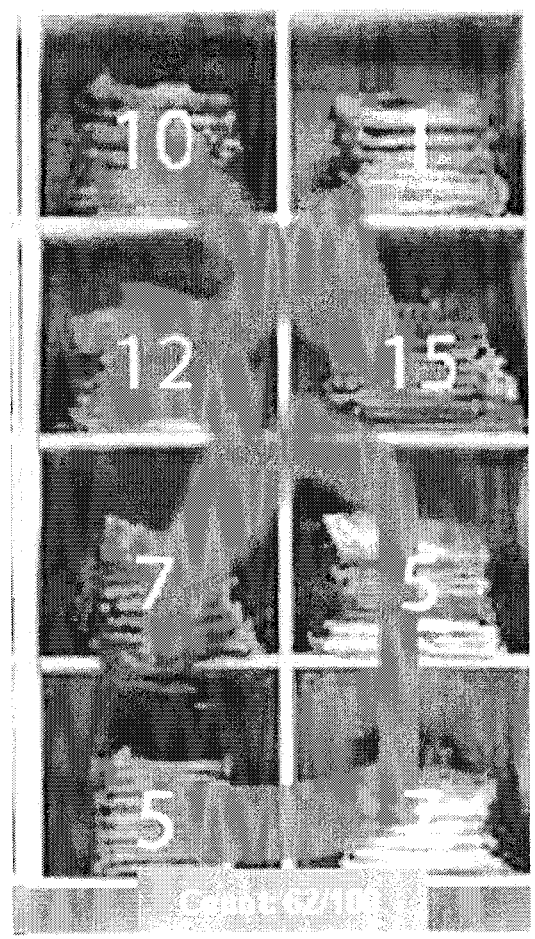
FIG. 1 schematically illustrates clusters of successfully read RFID tags displayed by an EIR terminal.

The EIR terminal can read RFID tags from a range of distances and various terminal orientations with respect to an RFID tag being read. To further improve the reliability of scanning operations and the terminal's operator experience, the EIR terminal can be configured to display the quantity of successfully read RFID tags overlaid over an image of a physical structure (e.g., a shelving unit) sustaining the items bearing the RFID tags (e.g., inventory items at a manufacturing, retail or a storage facility). In a further aspect, the portable EIR terminal can be configured to group a plurality of successfully read RFID tags into zero or more clusters, and display the quantities of RFID tags within each cluster with a visual reference to a fragment of the physical structure sustaining items bearing the RFID tags comprised by each cluster, as schematically shown in FIG. 1.

Such a capability provides increased operational efficiency of RFID tag reading for retail inventory management. Various embodiments of the EIR terminal can be used in a numerous applications, including but not limited to, item tracking in manufacturing, storage, and retail, real-time inventory control systems, etc.

As described in the commonly assigned U.S. patent application Ser. No. 13/359,005 entitled "Portable RFID Reading Terminal with Visual Indication of Scan Trace" filed on Jan. 26, 2012, which is incorporated herein by reference in its entirety, an EIR terminal can be configured to receive an expected count of inventory items or an expected inventory list of items of interest stored within a storage, manufacturing, and/or retail facility. The EIR terminal can be further configured to reconcile the inventory of items stored within a storage, manufacturing, and/or retail facility against the expected count of inventory items or the expected inventory list by reading the RFID tags attached to the inventory items. As used herein, "inventory list" shall refer to a collection of item descriptions, each item description comprising at least the item identifier.

As described in the commonly assigned U.S. patent application Ser. No. 13/452,133, entitled "System and Method for Calibration and Mapping of Real-Time Location Data" filed concurrently herewith, which is incorporated herein by reference in its entirety, an EIR terminal configured to read RFID tags can be augmented with an imaging device, positioning package, including but not limited to, a 3-axis (3 dimensional) accelerometer package, and a 9-DOF (degree of freedom) IMU (Inertial Measurement Unit) containing a 3-axis accelerometer, a 3-axis magnetometer, and 3-axis gyroscope sensors, to acquire movement and position calibration data regarding the motion of the EIR terminal.

Figure 2:
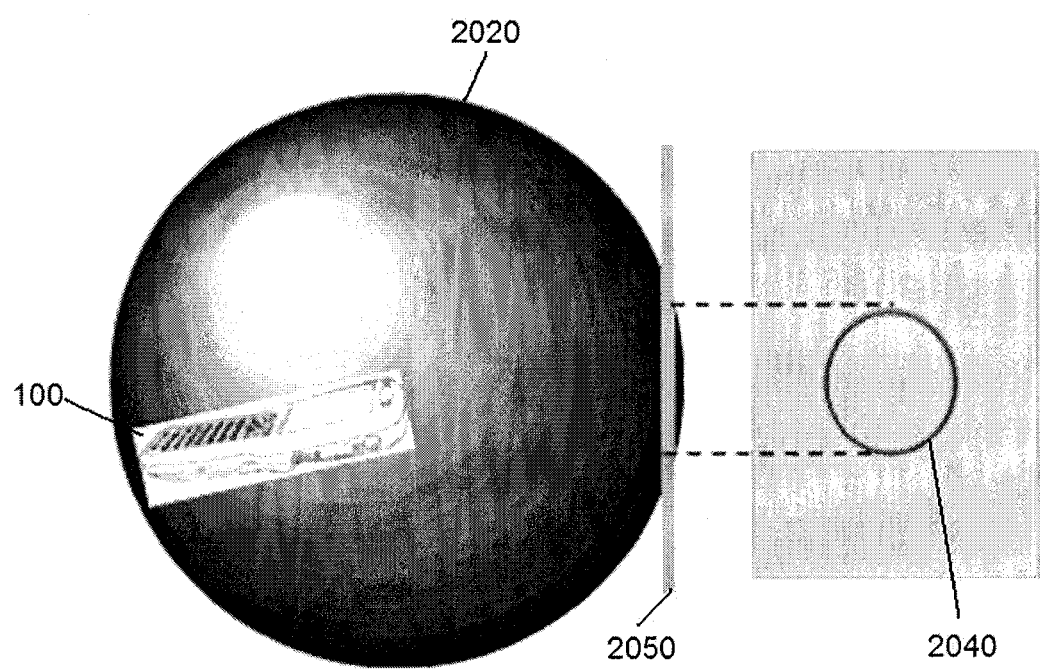
FIG. 2 schematically illustrates an RF signal coverage shape by the EIR terminal.

At any moment in time, the RF signal coverage emitted by an EIR terminal can be defined by a 3D shape, as schematically shown in FIG. 2. The form and size of the 3D shape defining the RF signal coverage can depend, among other factors, on the RFID transmit power level and the number and configuration of the RF antennas employed by the RFID reading device. In one embodiment, the RF signal coverage shape can be provided by a sphere 2020. In another embodiment, the RF signal coverage shape can be provided by an ellipsoid. In a yet another embodiment, the RF signal coverage shape can be provided by a cone. In some embodiments, the RF signal coverage shape can have an irregular shape, the irregularity being caused, for example, by the EIR terminal's having two or more antennas which can transmit RF signals of different power. In a further aspect, the EIR terminal can have a capability of determining the current transmit power of each of two or more antennas, and determine the expected RF signal coverage shape.

At any given moment in time, a target scan area by an EIR terminal can be visualized as a projection 2040 of the 3D RF signal coverage shape 2020 onto an arbitrarily chosen plane 2050, including an imaginary plane. In one embodiment, the EIR terminal can be further configured to display a visual scan trace overlaid over an image of the physical structure (e.g., a shelving unit) sustaining a plurality of items bearing RFID tags (e.g., retail items). For a moving EIR terminal, the visual scan trace can be provided by a line defined by a multitude of time varying points, each point being a projection 2040 of the 3D RF signal coverage shape 2020 onto the arbitrarily chosen plane 2050 at a given moment in time. In a further aspect, the imaginary plane onto which the visual scan trace is projected can be chosen to intersect a physical structure (e.g., a shelf) containing the inventory items, and thus the scan trace can be overlaid over an image of the physical structure.

Figure 3:
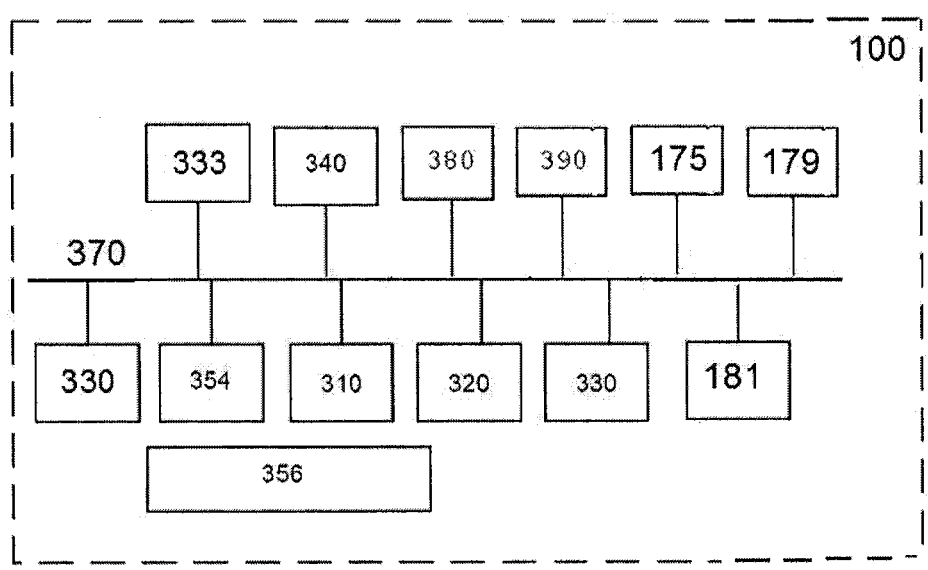
FIG. 3 schematically illustrates a component-level diagram of one embodiment of the EIR terminal.

Component-level diagram of one embodiment of the EIR terminal is now being described with references to FIG. 3. The EIR terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, EIR terminal 100 can comprise a single microprocessor which can be referred to as a central processing unit (CPU). In another embodiment, EIR terminal 100 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

EIR terminal 100 can further comprise a communication interface 340 communicatively coupled to the system bus 370. In one embodiment, the communication interface can be provided by a wireless communication interface. The communication interface can be configured to support, for example, but not limited to, the following protocols: at least one protocol of the IEEE 802.3/IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1×EV-DO protocol family.

EIR terminal 100 can further comprise a battery 356. In one embodiment, the battery 356 can be provided by a replaceable rechargeable battery pack. The EIR terminal 100 can further comprise a GPS receiver 380. The EIR terminal 100 can further comprise at least one connector 390 configured to receive a subscriber identity module (SIM) card.

The EIR terminal 100 can further comprise an imaging device 330, provided, for example, by a two-dimensional imager. The EIR terminal 100 can further comprise a motion sensing device 354.

The EIR terminal 100 can further comprise an RFID reading device 333. In one embodiment, the RFID reading device 333 can be configured to read a memory of an RFID tag containing an encoded message and to output raw message data containing the encoded message. In another embodiment, the RFID reading device 333 can be configured to read a memory of an RFID tag containing an encoded message and to output decoded message data corresponding to the encoded message. As used herein, "message" is intended to denote a bit sequence or a character string comprising alphanumeric and/or non-alphanumeric characters. An encoded message can be used to convey information, such as identification of the source and the model of an item, for example, in an EPC code.

In one embodiment, the EIR terminal 100 can further comprise a graphical user interface including a display adapter 175 and a keyboard 179. In one embodiment, the EIR terminal 100 can further comprise an audio output device, e.g., a speaker 181.

It is not necessary that a device's primary function involve reading RFID tags in order to be considered an EIR terminal; for example, a cellular telephone, a smart phone, a PDA, or other portable computing device that is capable of reading RFID tags can be referred to as an EIR terminal for purposes of this disclosure.

Figure 4:
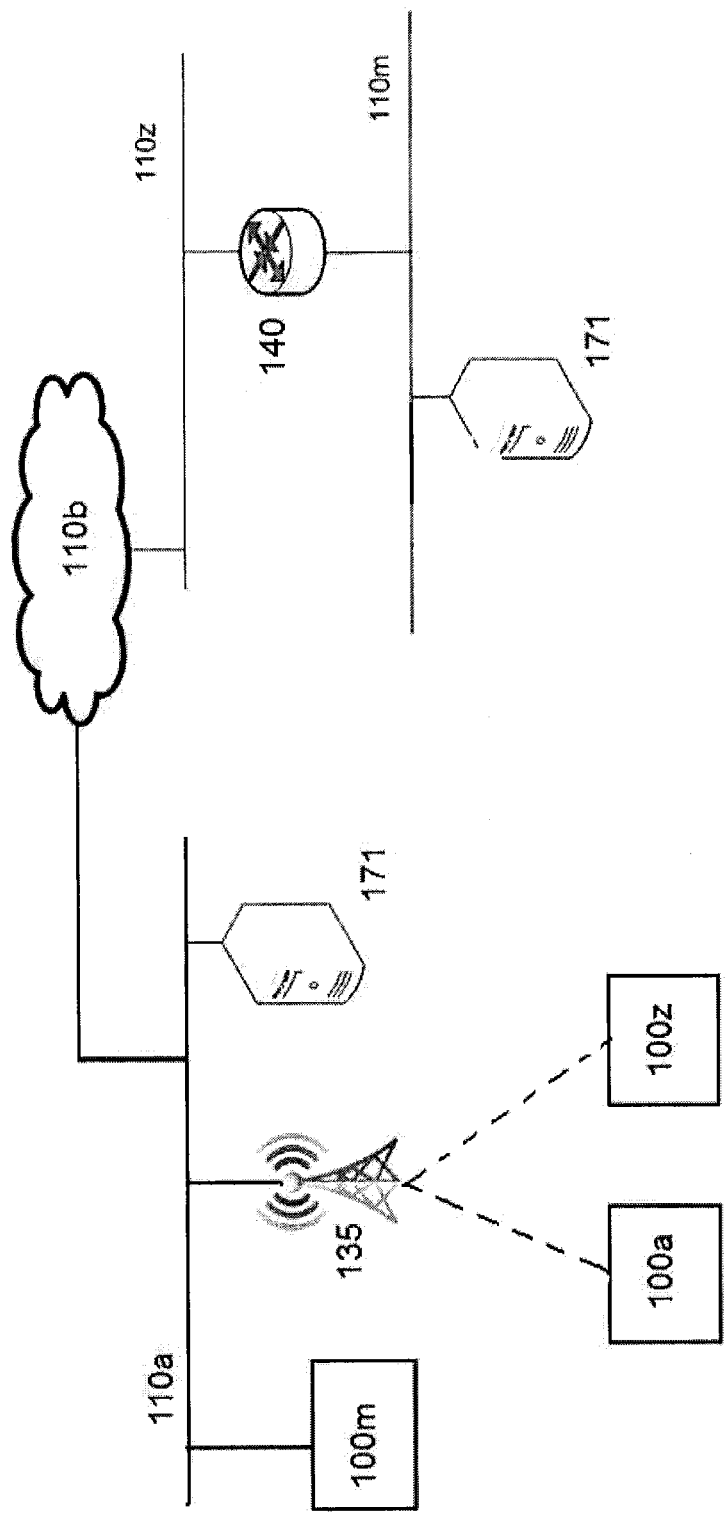
FIG. 4 schematically illustrates a network diagram of one embodiment of a data collection system employing EIR terminals.

In a further aspect, the EIR terminal can be incorporated in a data collection system. One embodiment of the data collection system, schematically shown in FIG. 4, can include a plurality of EIR terminals 100*a*-100*z* in communication with a plurality of interconnected networks 110*a*-110*z*.

An EIR terminal 100*a*-100*z* can establish a communication session with an external computer 171. In one embodiment, network frames can be exchanged by the EIR terminals 100*a*-100*z* and the external computer 171 via one or more routers 140, access points 135, and other infrastructure elements. In another embodiment, the external computer 171 can be reachable by the EIR terminal 100*m* via a local area network (LAN). In a yet another embodiment, the external computer 171 can be reachable by the EIR terminal 100 via a wide area network (WAN). In a yet another embodiment, the external computer 171 can be reachable by the EIR terminal 100 directly (e.g., via a wired or wireless interface). A skilled artisan would appreciate the fact that other methods of providing interconnectivity between the EIR terminal 100 and the external computer 171 relying upon LANs, WANs, virtual private networks (VPNs), and/or other types of network are within the scope of this disclosure.

A "computer" herein shall refer to a programmable device for data processing and control, including a central processing unit (CPU), a memory, and at least one communication interface. For example, in one embodiment, a computer can be provided by a server running a single instance of a multi-tasking operating system. In another embodiment, a computer can be provided by a virtual server, i.e., an isolated instance of a guest operating system running within a host operating system. A "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the application layer interface to the network layer of the OSI model can comprise a plurality of lower layer networks, i.e., what can be regarded as a single Internet Protocol (IP) network, can include a plurality of different physical networks.

The communications between the EIR terminal 100 and the external computer 171 can comprise a series of requests and responses transmitted over one or more TCP connections. A skilled artisan would appreciate the fact that using various transport and application level protocols is within the scope and the spirit of the invention.

In one embodiment, at least one of the messages transmitted by the EIR terminal 100 can include decoded message data corresponding to an RFID label attached to an inventory item. For example, an EIR terminal can transmit a request to the external computer to retrieve product information corresponding to a product identifier encoded by an RFID tag attached to a retail item, or to transmit an item tacking record for an item identified by an RFID tag attached to the item.

As noted herein supra, the EIR terminal 100 can be configured to receive from the external computer 171 information including, but not limited to an inventory list containing item identifiers, or count, of items stored within a storage, manufacturing, and/or retail facility. The inventory list or count can further contain storage location information of specific items. The EIR terminal 100 can be further configured to transmit to the external computer 171 information including, but not limited to a list of read RFID tags, a count of read RFID tags, a count of clusters of RFID tag bearing items, a list of items in each cluster, and/or a list of locations of clusters.

In one embodiment, the EIR terminal 100 can be configured to receive from the external computer 171 one or more images of physical structures sustaining inventory items bearing RFID tags. An image can be provided, for example, by a photographical image or by a rendered outline.

As noted herein supra, the EIR terminal 100 can be configured, responsive to successfully reading a plurality of RFID tags attached to a plurality of items sustained by a physical structure, to group the RFID tags into zero or more clusters, and display a quantity of RFID tags within each cluster overlaid over an image of the physical structure, with a visual reference to a fragment of the visual structure corresponding to spatial positions of the RFID tags comprised by each cluster.

Figure 5B:
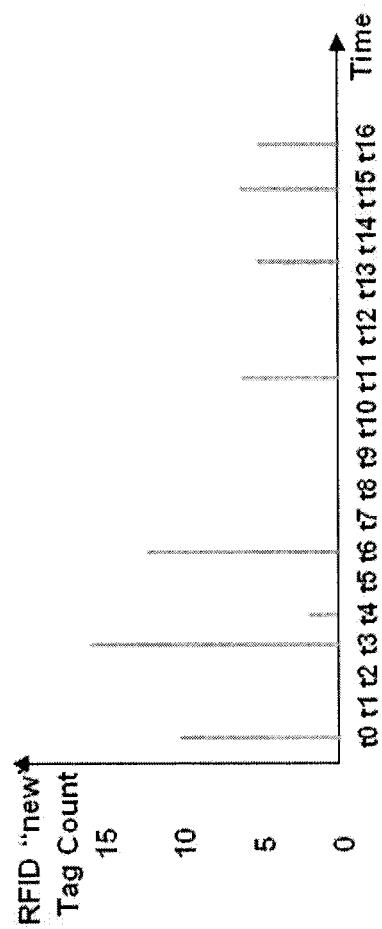
FIGS. 5a-5b schematically illustrate grouping a plurality of successfully read RFID tags into several clusters.
Figure 5A:
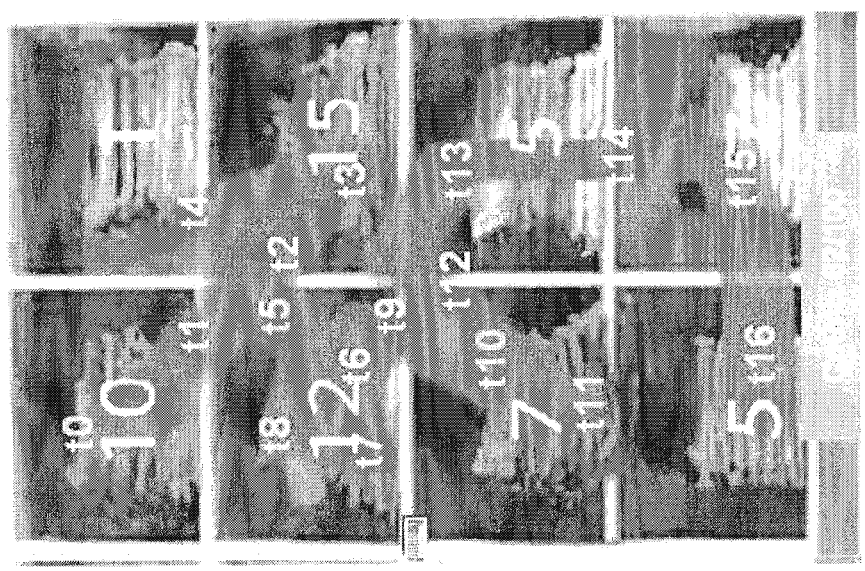

In a further aspect, the EIR terminal can be configured to store in its memory the identifiers of successfully read RFID tags together with timestamps of the read events. The EIR terminal can use the stored information to correlate quantities of RFID tags read within several time periods to spatial positions of the coverage shapes of the RFID signals transmitted by the RFID reading device. Based on the correlation, the EIR terminal can group the RFID tags into several clusters, as schematically shown in FIGS. 5*a*-5*b*. FIG. 5*a* illustrates eight stacks of RFID bearing items sustained by a shelving unit. FIG. 5*b* illustrates a graph showing the number of RFID tags that were read over the time periods t0-16. Based on the graph of FIG. 5*b*, eight clusters of RFID tags can be revealed.

In a further aspect, the EIR terminal can be configured to determine the spatial positions of the RFID signal coverage shapes based on spatial positions and orientations of the terminal during the several time periods.

In a further aspect, the EIR terminal can be configured to display the quantities of RFID tags within each cluster overlaid over an image of the physical structure, with a visual reference to a fragment of the physical structure (e.g., a shelf of a shelving unit) corresponding to spatial positions of the RFID tags comprised by each cluster.

Figure 6A:
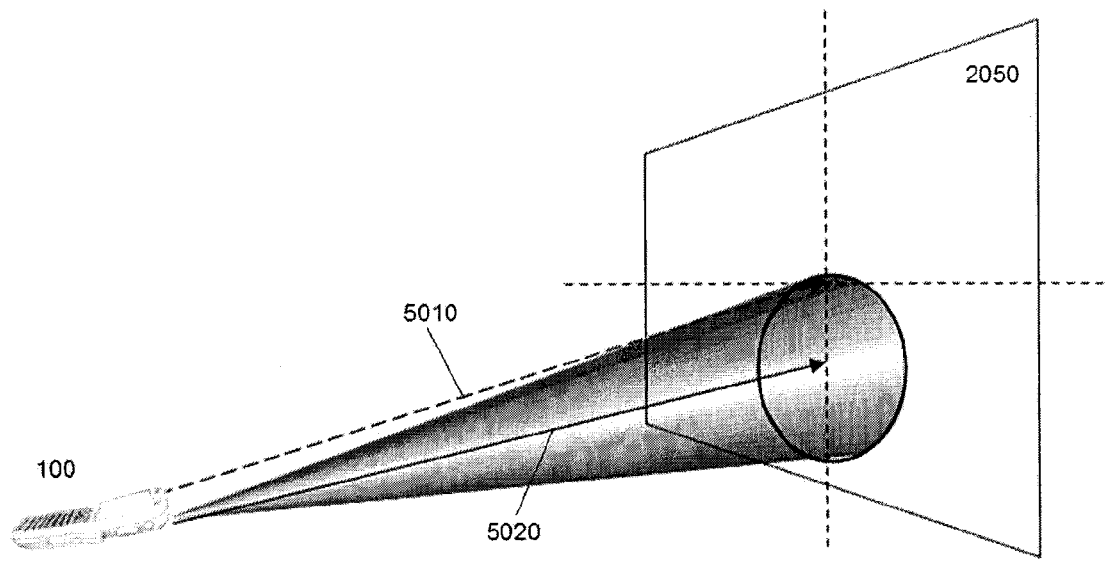
FIGS. 6a-6b schematically illustrate determining a spatial position of the RF signal coverage shape based on the position and orientation of an RF antenna relatively to the position of the field of view of a two-dimensional imager.
Figure 6B:
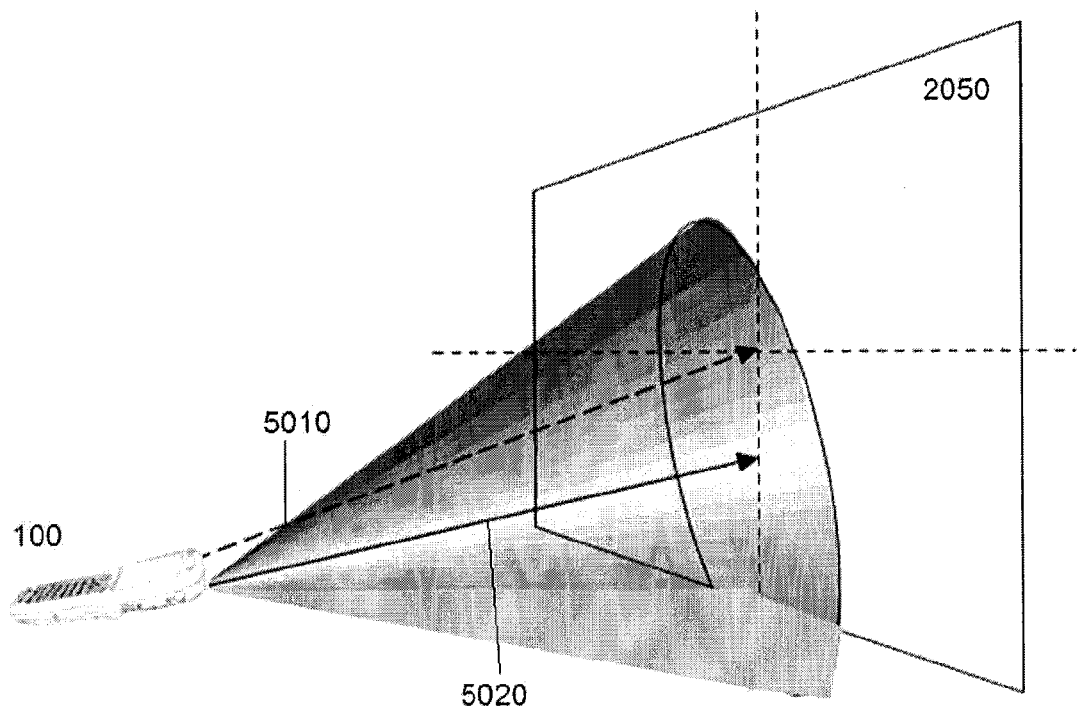

In one embodiment, the EIR terminal can comprise a two-dimensional imager. The EIR terminal can be configured to determine a spatial position of the RF signal coverage shape based on the known position and orientation of the RF antenna relatively to the position of the field of view (FOV) of the two-dimensional imager, as schematically shown in FIGS. 6a-6b.

As noted herein supra, at any given moment in time, a target scan area by an EIR terminal can be visualized as a projection 2040 of the 3D RF signal coverage shape 2020 onto an arbitrarily chosen plane 2050, including an imaginary plane. The plane 2050 can represent an arbitrary chosen plane, e.g., a plane intersecting a physical structure hosting one or more inventory items. The RF antenna can be oriented relatively to the view finder in such a way that the central axis 5010 of the field of view of the imager would be parallel to the central axis 5020 of the RF signal coverage shape by the antenna. Reducing the distance between the EIR terminal and the plane 2050 and/or increasing the RF transmit power level results in a larger projection of the RF signal coverage area onto the plane 5020, as schematically shown in FIGS. 6a-6b. In the example of FIG. 6b, the lesser distance and/or the greater transmit power level results in a larger projection RF signal coverage area onto the plane 2050. The projection of the RF signal coverage shape onto the plane 2050 can be entirely within the FOV of the two-dimensional imager, as schematically shown in FIG. 6a, or can be partially outside of the FOV of the two-dimensional imager, as schematically shown in FIG. 6b.

Based on the expected shape of the signal coverage and the distance and orientation of the RF antenna to a physical structure (e.g., depicted as plane 2050 in FIG. 2) containing the inventory items, the EIR terminal can determine and display the projection of the 3D RF signal coverage shape onto the plane defined by the physical structure.

In another embodiment, the EIR terminal can comprise a motion sensing device and can be configured to determine the change of the spatial position and orientation of the RF signal coverage shape based on the motion sensing data received from the motion sensing device. In one illustrative embodiment, the motion sensing device can comprise three or more accelerometers configured to measure proper acceleration values of the EIR terminal along three mutually perpendicular axes.

As noted herein supra, in one embodiment, the EIR terminal 100 can be further configured to display the quantities of RFID tags by cluster and/or a scan trace overlaid over an image of a physical structure (e.g., a shelf) containing one or more scanned items and possibly one or more items yet to be scanned. In one embodiment, the image of the physical structure containing the inventory items can be received by the EIR terminal 100 over the network from an external computer 171. In another embodiment, the EIR terminal 100 can comprise a two-dimensional imager, and the image of the physical structure containing the inventory items can be acquired by the two-dimensional imager. In another embodiment, the image of the physical structure is drawn, with appropriate detail, on the EIR terminal display, based on a description of the physical structure received by the terminal 100 via the user interface, from an external peripheral device or from an external computer.

In a further aspect, RFID reading device 333 can be compliant with *EPC™ Class-1 Generation-2 UHF RFID Protocol for Communications at 860 MHz-960 MHz* by EPCglobal, commonly known as the "Gen 2" standard, which defines physical and logical requirements for a passive-backscatter, interrogator-talks-first (ITF) RFID system operating in the 860 MHz-960 MHz frequency range.

In one embodiment, EIR terminal 100 can transmit information to a passive RFID tag by modulating an RF signal in the 860-960 MHz frequency range. An RFID tag can receive both information and operating energy from the RF signal transmitted by the EIR terminal 100. EIR terminal 100 can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the EIR terminal 100. In one embodiment, the RFID tag can modulate the reflection coefficient of its antenna only responsive to receiving an RFID signal from EIR terminal 100.

In a further aspect, EIR terminal 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tags can receive their operating energy from the same modulated RF carrier.

The EIR terminal 100 can be configured to receive information from an RFID tag by transmitting an unmodulated RF carrier and listening for a backscatter reply. RFID tags can transmit information by backscatter-modulating the amplitude and/or phase of the RFID carrier. RFID tags can encode the backscattered data using, e.g., FM0 baseband or Miller modulation of a subcarrier at the data rate. The encoding method to be employed by an RFID tag can be selected by the EIR terminal 100.

In another aspect, EIR terminal can establish one or more sessions with one or more RFID tags. An RFID tag can support at least one session-dependent flag for every session. The session-dependent flag can have two states. An RFID tag can invert a session-dependent flag responsive to receiving a command from EIR terminal 100. Tag resources other than session-dependent flags can be shared among sessions. In another aspect, an RFID tag can support a selected status flag indicating that the tag was selected by the EIR terminal 100.

Responsive to receiving an interrogation signal transmitted by the EIR terminal 100, an RFID tag can transmit a response signal back to EIR terminal 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, EIR terminal can implement *EPC™ Class-1 Generation-2 UHF RFID Protocol for Communications at 860 MHz-960 MHz* by EPCglobal. The EIR terminal 100 can interrogate RFID tags using the commands described herein infra.

Select command can be used by the EIR terminal 100 to select a particular RFID tag population for the subsequent inventory round. Select command can be applied successively to select a particular tag population based on user-specified criteria. Select command can include the following parameters:

Target parameter indicates whether Select command modifies a tag's SL flag or Inventoried flag, and in the latter case it further specifies one of four available sessions (S0, . . . , S3);

Action parameter indicates whether matching tags assert or deassert SL flag, or set their Inventoried flag to A or B state; tags conforming to the contents of MemBank, Pointer, Length, and Mask parameters are considered to be matching;

Mask parameter contains a bit string that a tag should compare to a memory location specified by MemBank, Pointer, and Length parameters;

MemBank parameter specifies the memory bank to which Mask parameter refers (EPC, TID, or User);

Pointer parameter specifies a memory start location for Mask;

Length parameter specifies the number of bits of memory for Mask; if Length is equal to zero, all tags are considered matching.

Inventory command set can be used by the EIR terminal 100 to single out one or more individual tags from a group of RFID tags. A tag can maintain up to four simultaneous sessions and a binary Inventoried flag for each session. Inventory command set includes the following commands:

Query command can be used to initiate and specify an inventory round; it contains a slot counter value (Q=0 to 15) determining the number of slots in the round; the command also includes Sel parameter specifying which tags should respond to the Query.

QueryAdjust command can be used to adjust the value of the tag's slot counter Q without changing any other parameters;

QueryRep command can be used to repeat the last Query command;

Ack command can be used to acknowledge a tag's response;

NAK command can be used to force a tag to change its state to Arbitrate.

An RFID tag can implement a state machine. Once energized, a tag can change its current state to Ready. A selected tag can, responsive to receiving Query command, select a random integer from the range of $[0; 2^{Q-1}]$. If the value of zero is selected, the tag can transition to Reply state, backscattering a 16-bit random number. If a non-zero value is selected, the tag can load the selected random integer into its slot counter and change its state to Arbitrate.

Responsive to receiving the tag transmission, EIR terminal can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of $[0; 2^{Q-1}]$, load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, EIR terminal can send a QueryAdjust command causing the tag to invert its Inventoried flag and to transition to Ready state.

Access command set can be used by the EIR terminal 100 for communicating with (reading from and writing to) a tag. An individual tag must be uniquely identified prior to access. Access command set includes the following commands:

ReqRn command can be used by the EIR terminal 100 to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by the EIR terminal 100 to read tag's Reserved, EPC, TID and User memory;

Write command can be used by the EIR terminal 100 to write to tag's Reserved, EPC, TID and User memory;

Kill command can be used by the EIR terminal 100 to permanently disable a tag;

Lock command can be used by the EIR terminal 100 to lock passwords preventing subsequent read or write operations; lock individual memory banks preventing subsequent write operations; permanently lock the lock status of passwords or memory banks;

Access command can be used by the EIR terminal 100 to cause a tag having a non-zero access password to transition from Open to Secured state.

A skilled artisan would appreciate the fact that other methods of interrogating RFID tags by the EIR terminal 100 are within the scope of this disclosure.

Figure 7A:
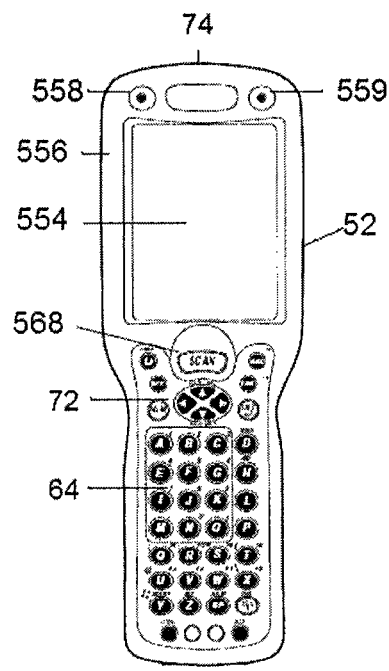
FIGS. 7a-7c schematically illustrate embodiments of an EIR terminal.
Figure 7B:
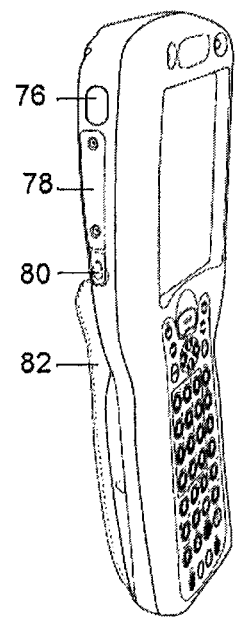
Figure 7C:
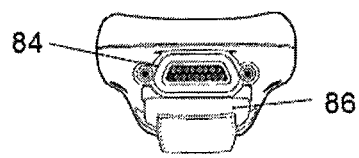

One embodiment of the EIR terminal 100 is schematically shown in FIGS. 7a (front panel view), 7b (side panel view), and 7c (bottom panel view). The EIR terminal 100 can comprise a housing 52 within which other components of the EIR terminal 100 can be disposed. An LCD screen display with a touch screen sensor 554 can be disposed on the front panel 556. Also disposed on the front panel 556 can be a decode LED 558, a scan LED 559, and a keyboard 64 including a scan key 568 and navigation keys 72. An imaging window 74 can be disposed on the top panel of housing 52. Disposed on the side panel (best viewed in FIG. 7b) can be an infra-red communication port 76, an access door to a secure digital (SD) memory interface 78, an audio jack 80, and a hand strap 82. Disposed on the bottom panel (best viewed in FIG. 7c) can be a multi-pin mechanical connector 84 and a hand strap clip 86. RFID reading device (not shown in FIGS. 7a-7c) can be disposed within the housing 52.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A portable radio-frequency identifier (RFID) reading terminal can comprise a microprocessor, a memory, an RFID reading device, and a display. The portable EIR terminal can be configured, responsive to successfully reading a plurality of RFID tags attached to a plurality of items sustained by a physical structure, to group the plurality of read RFID tags into zero or more clusters, by correlating quantities of RFID tags read within several time periods to spatial positions of the coverage shapes of the RF signals transmitted by the RFID reading device during the several time periods. The EIR terminal can be further configured to determine the spatial positions of the RFID signal coverage shapes based on the spatial positions and orientations of the portable EIR terminal during the several time periods. The EIR terminal can be further configured to display a quantity of RFID tags within each cluster overlaid over an image of the physical structure, with a visual reference to a fragment of the physical structure corresponding to the spatial positions of the RFID tags comprised by each cluster.

A small sample of systems, methods, and apparata that are described herein is as follows:

A1. A portable radio-frequency identifier (RFID) reading terminal comprising:
a microprocessor;
a memory;
an RFID reading device;
a display;
wherein said portable EIR terminal is configured, responsive to successfully reading a plurality of RFID tags attached to a plurality of items sustained by a physical structure, to group said plurality of read RFID tags into zero or more clusters, by correlating quantities of RFID tags read within several time periods to spatial positions of coverage shapes of RF signals transmitted by said RFID reading device during said several time periods, said spatial positions of said coverage shapes of said RFID signals determined based on spatial positions and orientations of said portable EIR terminal during said several time periods;
wherein said portable EIR terminal is further configured to display a quantity of RFID tags within each cluster overlaid over an image of said physical structure, with a visual reference to a fragment of said physical structure corresponding to spatial positions of one or more RFID tags comprised by each cluster.

A2. The portable EIR terminal of (A1), further configured to display a scan trace overlaid over said image of said physical structure;
wherein said scan trace is provided by a line comprising a plurality of time varying points, each point being defined by a projection onto a chosen plane at a given moment in time of said coverage shape of said RF signal transmitted by said RFID reading device.

A3. The portable EIR terminal of (A1), further comprising a two-dimensional imager;
wherein said portable EIR terminal is further configured to determine a spatial position of said RF signal coverage shape based on a position and orientation of said RF antenna relatively to a position of a field of view of said two-dimensional imager.

A4. The portable EIR terminal of (A1), further comprising a motion sensing device;
wherein said portable EIR terminal is further configured to determine a change of a spatial position and orientation of said RF signal coverage shape based on motion sensing data received from said motion sensing device.

A5. The portable EIR terminal of (A1), further comprising a motion sensing device;
wherein said motion sensing device comprises three or more accelerometers configured to measure proper acceleration values of said EIR terminal along three mutually perpendicular axes.

A6. The portable EIR terminal of (A1), further configured to receive an image of said physical structure from an external computer.

A7. The portable EIR terminal of (A1), further configured to receive a description of a physical structure;
wherein said portable EIR terminal is further configured to create an image of said physical structure based on said description.

A8. The portable EIR terminal of (A1), further comprising a two-dimensional imager;
wherein said portable EIR terminal is further configured to acquire an image of said physical structure using said two-dimensional imager.

A9. The portable EIR terminal of (A1), further configured to transmit to an external computer at least one of: a list of read RFID tags, a count of read RFID tags, a count of clusters of RFID tag bearing items, a list of items in each cluster, and/or a list of locations of clusters to an external computer.

The invention claimed is:

1. A device comprising:
an RFID reader that reads a plurality of RFID tags in an area comprising a plurality of locations and calculates a number of the RFID tags that are in each of the locations; and
a display that:
displays an image of the area, and
overlays a numerical value representing the number of the RFID tags within each of the locations over the respective locations displayed in the image,
wherein the display displays a scan trace overlaid over said image;
wherein the scan trace is provided by a line comprising a plurality of time varying points, each point being defined by a projection onto a chosen plane at a given moment in time of a coverage shape of an RF signal transmitted by the RFID reader.

2. The device of claim 1, further comprising:
a two-dimensional imager; and
an RF antenna;
wherein a spatial position of said RF signal coverage shape is based on a location and orientation of said RF antenna relative to a field of view of said two-dimensional imager.

3. The device of claim 2, further comprising a motion sensing device;
wherein a change of the location and orientation of said RF signal coverage shape is determined based on motion sensing data received from said motion sensing device.

4. The device of claim 1, further comprising a motion sensing device;
wherein said motion sensing device comprises three or more accelerometers configured to measure proper acceleration values of said RFID reader along three mutually perpendicular axes.

5. The device of claim 1, further comprising a receiver that receives the image from an external computer.

6. The device of claim 1, further comprising a receiver to receive a description of the image;
wherein said device is further configured to create the image based on said description.

7. The device of claim 1, further comprising a two-dimensional imager;
wherein said device is further configured to acquire the image using said two-dimensional imager.

8. The device of claim 1, further comprising a system configured to transmit to an external computer at least one of: a list of read RFID tags, a count of read RFID tags, a count of clusters of RFID tag bearing items, a list of items in each respective location, and/or a list of the respective locations.

9. The device of claim 1, wherein the device is configured to identify each of the respective locations based on the RF coverage shape of the RF signal transmitted by the RFID reader and a location of the RFID reader relative to the respective locations.

10. The device of claim 9, wherein the device is further configured to calculate the number of RFID tags in each of the identified, respective locations based on RFID tag identifiers received while the RF coverage shape of the RF signal transmitted by the RFID reader is positioned over each respective location.

11. The device of claim 10, wherein the device is further configured to calculate a first number of RFID tags in a first identified location based on the RFID tag identifiers received while the RF coverage shape of the RF signal transmitted by of the RFID reader is only positioned over the first identified location.

12. The device of claim 1, wherein the image is an actual image taken of the plurality of locations.

13. The device of claim 1, wherein the image that is displayed corresponds to the plurality of locations.

14. A device comprising:
   an RFID reader that reads at least one RFID tag in an area and determines a number of the at least one RFID tag that is in the area; and
   a display that:
      displays an actual image of the area, and
      overlays a numerical value for the number of the at least one RFID tag react within the area over the actual image,
   wherein the display displays a scan trace overlaid over the actual image, and
   wherein said scan trace is provided by a line comprising a plurality of time varying points, each point being defined by a projection onto a chosen plane at a given moment in time of a coverage shape of an RF signal transmitted by said RFID reader.

15. A device comprising:
   an RFID reader that reads at least one RFID tag in an area and determines a number of the at least one tag that is in the area; and
   a display that:
      displays an image of the area, and
      overlays a numerical value for the number of the at least one RFID tag read within the area over the image,
   wherein the display displays a scan trace overlaid over said image;
   wherein the scan trace is provided by a line comprising a plurality of time varying points each point being defined by a projection onto a chosen plane at a given moment in time of a coverage shape of an RF signal transmitted by said RFID reader.

16. The device of claim 15, wherein the image comprises an actual image of the area.

* * * * *